United States Patent
Fleck

(10) Patent No.: US 8,063,890 B2
(45) Date of Patent: Nov. 22, 2011

(54) DEVICE, METHOD, AND COMPUTER READABLE MEDIUM FOR MAPPING A GRAPHICS TABLET TO AN ASSOCIATED DISPLAY

(75) Inventor: David Fleck, Vancouver, WA (US)

(73) Assignee: Wacom Co., Ltd., Saitama-Ken (JP)

( * ) Notice: Subject to any disclaimer, the term of this patent is extended or adjusted under 35 U.S.C. 154(b) by 980 days.

(21) Appl. No.: 11/798,620

(22) Filed: May 15, 2007

(65) Prior Publication Data

US 2008/0284730 A1 Nov. 20, 2008

(51) Int. Cl.
*G06F 3/041* (2006.01)
(52) U.S. Cl. .................. 345/173; 345/179; 178/18.01
(58) Field of Classification Search .......... 345/173, 345/156–172, 179; 178/18.01–18.11
See application file for complete search history.

(56) References Cited

U.S. PATENT DOCUMENTS

| | | | | |
|---|---|---|---|---|
| 4,479,032 A * | 10/1984 | Parnell | | 178/19.01 |
| 4,716,542 A | 12/1987 | Peltz et al. | | |
| 4,935,728 A * | 6/1990 | Kley | | 345/161 |
| 5,294,792 A * | 3/1994 | Lewis et al. | | 250/221 |
| 5,491,495 A * | 2/1996 | Ward et al. | | 345/173 |
| 5,757,361 A * | 5/1998 | Hirshik | | 345/156 |
| 5,768,492 A | 6/1998 | Schumer | | |
| 6,353,433 B1 | 3/2002 | Schumer | | |
| 6,489,948 B1 * | 12/2002 | Lau | | 345/163 |
| 6,816,148 B2 | 11/2004 | Mallett et al. | | |
| 7,242,387 B2 * | 7/2007 | Fitzmaurice et al. | | 345/157 |
| 7,557,797 B2 * | 7/2009 | Ludwig | | 345/163 |
| 7,576,726 B2 * | 8/2009 | Harley et al. | | 345/157 |
| 2002/0033799 A1 * | 3/2002 | Mallett et al. | | 345/156 |
| 2004/0196267 A1 * | 10/2004 | Kawai et al. | | 345/173 |
| 2006/0267934 A1 * | 11/2006 | Harley et al. | | 345/157 |
| 2007/0218731 A1 * | 9/2007 | Tanaka et al. | | 439/165 |

\* cited by examiner

*Primary Examiner* — Richard Hjerpe
*Assistant Examiner* — Sahlu Okebato
(74) *Attorney, Agent, or Firm* — Berenato & White, LLC

(57) ABSTRACT

A digitizer system for controlling movement of a pointer on a display unit is provided. The system includes a digitizer tablet for detecting an input position and generating tablet coordinate data according to the detected input position. A mapping unit maps the tablet coordinate data to display coordinate data based on a plurality of different predetermined scaling relationships and provides the display coordinate data to the display unit. An input device controls the mapping unit to switch between the predetermined scaling relationships.

19 Claims, 4 Drawing Sheets

DEVICE, METHOD, AND COMPUTER READABLE MEDIUM FOR MAPPING A GRAPHICS TABLET TO AN ASSOCIATED DISPLAY

FIELD OF THE INVENTION

The present invention relates to a device, method, and computer readable medium for mapping positional data of a graphics tablet to an associated display.

BACKGROUND OF THE INVENTION

Graphics tablets or digitizer tablets are computer peripherals used for drawing or navigating on a computer system. Graphics tablets typically include a flat sensing area and an associated tool that is usually either pen shaped or mouse shaped. These tablets measure X and Y coordinate positions as well as other parameters, such as pen tip pressure, pen tilt, mouse buttons, mouse rotation, etc. Various technologies can be used to implement the graphics tablet. One exemplary technology is resistive, where voltage ratios are measured across conductive sheets to determine position. Another exemplary technology is electromagnetic, where position is detected by interpolating signal strength across a series of inductive coils. Various other technologies are available including triangulating sound or light waves, measuring applied force at corners of the tablet, measuring electric field distortions, etc. The resolution of the detected position with these technologies is typically in the range of 0.025 mm or better.

The positional information from the tablet is most often used to move a pointer on the display during navigation, or to draw a "virtual ink" on the display during drawing operations. Since the resolution of a display is much less than the tablet, (roughly 0.25 mm per pixel) a coordinate transformation is needed to establish a relationship between the tablet and the display. The default transformation typically scales the tablet coordinates such that the entire width of the tablet scales to the entire width of the computer system desktop (where the desktop is a tiled collection of one or more monitors). The entire tablet height is typically scaled to the entire height of the desktop.

Systems with multiple monitors used to create a large desktop are growing in popularity. With small opaque digitizer tablets, mapping the small digitizer tablet across two or more monitors, or even one large monitor, results in a large physical scale difference so that a very small hand movement results in a large movement on the screen. For example, with a 4 by 5 inch tablet mapped to dual 19 inch monitors, a one inch movement on the tablet results in approximately 6 inches of movement on the monitors. In this arrangement, it is difficult for a user to perform a precise amount of movement on the desktop.

SUMMARY OF THE INVENTION

A mapping device usable for mapping positional data on a digitizer tablet to positional data on a display screen is provided. The device includes a mapping unit operable between a first mode in which tablet coordinates are mapped to screen coordinates lying in a region of a first size and a second mode in which tablet coordinates are mapped to screen coordinates lying in a region of a second size. The device also includes an input device for controlling said mapping unit to switch between the first and second modes of the digitizer tablet during real time operation of the digitizer tablet.

A digitizer system for controlling movement of a pointer on a screen of a display unit is also provided. A movement input device controls movement of the pointer on the display unit. The movement input device is operable in a rough positioning mode for moving the pointer large distances within a large movement window on the screen and a fine positioning mode for moving the pointer small distances within a small movement window on the screen. A user input device is associated with said movement input device for receiving a mode switch command for seamlessly switching between the rough positioning mode and the fine positioning mode during real time operation of said movement input device.

A digitizer system for controlling movement of a pointer on a display unit is further provided. The system includes a digitizer tablet for detecting an input position and generating tablet coordinate data according to the detected input position. A mapping unit maps the tablet coordinate data to display coordinate data based on a plurality of different predetermined scaling relationships and provides the display coordinate data to the display unit. A binary physical input device controls the mapping unit to switch between the predetermined scaling relationships each time the binary physical input device is activated.

A method of mapping positional data on a digitizer tablet to positional data on a display screen is provided. The method includes providing an initial coordinate mapping relationship between the digitizer tablet and the display screen, and receiving a control signal to change the initial coordinate mapping relationship to a predetermined alternate coordinate mapping relationship between the digitizer tablet and the display screen from a binary physical input device associated with the digitizer tablet. The initial coordinate mapping relationship is changed to the alternate coordinate mapping relationship based on the control signal.

A computer readable medium that performs the above-described method is also provided.

DETAILED DESCRIPTION OF THE INVENTION

Figure 1:
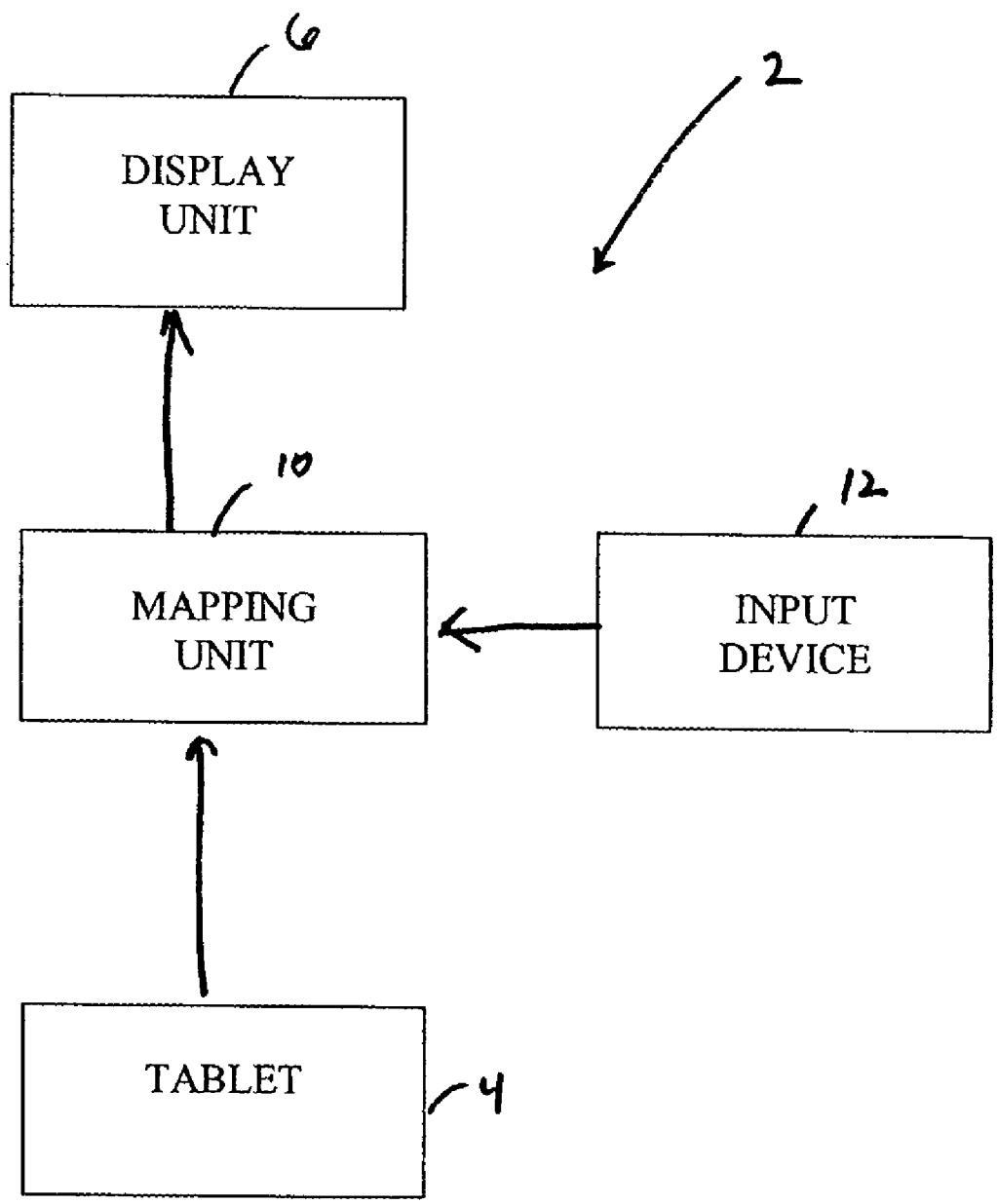
FIG. 1 is a block diagram illustrating a digitizer system according to an embodiment of the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

Some graphics tablets provide a control panel that allows a user some flexibility over the tablet to desktop relationship referred to herein as mapping. The user is given the option of selecting a portion less than the full tablet to be used for the mapping. The user can choose graphically, numerically, or by selecting the area on the tablet to be used. Likewise, the user is often given the option to select the portion of the desktop to which the tablet area is to be mapped. This can be achieved by selecting a particular monitor screen from among multiple monitors or screens, or by selecting an area of the desktop to be used for mapping graphically or numerically. If the user wants to change the current setting, they must access the control panel in the GUI and interact with the control panel in order to change the mapping. Accessing the control panel typically requires a plurality of selection commands including, for example selecting the control panel, selecting a function, selecting various parameters, etc.

Wacom Computer Limited offers products with "QuickPoint" mode mapping. This software maps two predefined tablet areas to one display area. One area is selected to be small in order to allow small hand movements to cover a large display area. The other area is selected to be large in order to allow detailed drawing or graphic positioning/movement. QuickPoint mode can be switched on and off, that is switched between the predefined dual QuickPoint areas and a single tablet area, via a tablet menu item or a screen menu.

Unlike the mapping functionality described above in which a user must access the control panel, dialog box, and/or tablet menu and change settings via a plurality of selection commands, the embodiments of the present invention enable a user to easily change a mapping between a tablet and a desktop "on the fly" or during real time operation of the tablet and display. Thus, a user's drawing or graphic positioning/movement is not interrupted by a change in mapping, and a user is able to draw and/or use a digitizer/graphics application while changing the mapping.

As best shown in FIG. 1, a digitizer system 2 according to an embodiment of the present invention includes a tablet 4 for detecting a position input, a display unit 6 for displaying a pointer 8 (see FIG. 2) among other things, a mapping unit 10 for mapping positional data from the tablet 4 into positional data for the display unit 6 based on a scaling relationship between the tablet 4 and the display unit 6, and an input device 12 for switching the scaling relationship between the tablet 4 and the display unit 6.

The tablet 4 is a digitizer tablet, which may be used for graphic design or other applications. The tablet 4 may be a Wacom digitizer tablet such as the tablets disclosed in U.S. Pat. Nos. 7,005,843, and 6,930,674, and 6,810,351, and 5,898,136, or 5,644,108, each of which is incorporated by reference in this description in their entireties.

Figure 3:
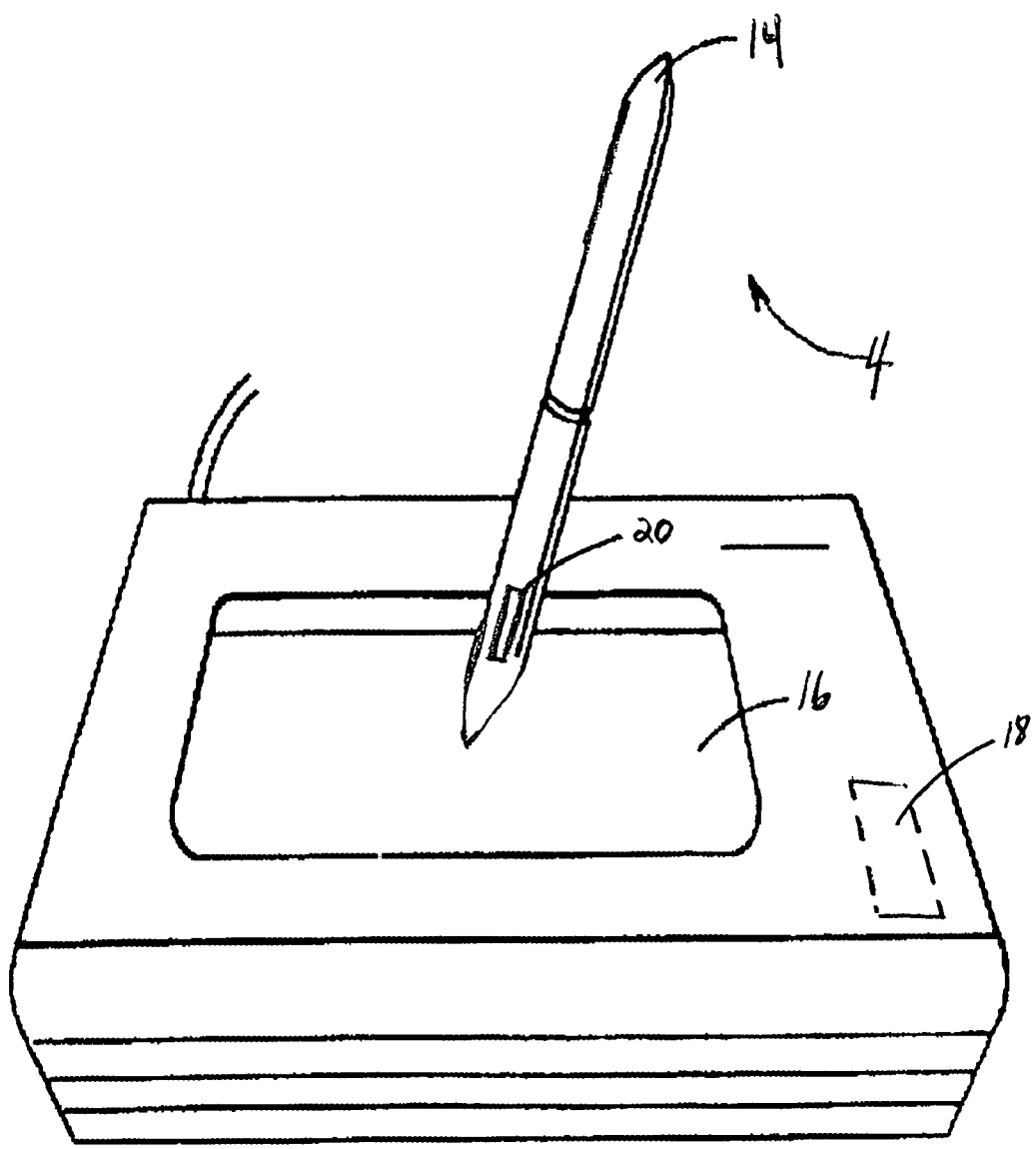
FIG. 3 is a perspective view of a digitizer tablet and pointing device according to another embodiment of the present invention.

As best shown in FIG. 3, the tablet 4 may be associated with a pointing device 14 for performing an input operation on or near a tablet detection surface 16. The tablet 4 has a plurality of sensing elements (not shown) arranged below the tablet detection surface 16 for detecting a position input along an X-Y coordinate grid defined in the tablet 4. The sensing elements generate positional data corresponding to the input position on the tablet detection surface 16.

The mapping unit 10 transforms the positional data corresponding to the input position, which is represented in terms of the X-Y coordinate grid of the tablet 4, to positional data for the display unit 6, which is represented in terms of an X-Y pixel coordinate grid. The input device 12 controls the mapping unit 10 to switch between scaling relationships. Based upon this transformation, the input position and/or movement along the tablet detection surface 16 shown in FIG. 3 can be represented on the display unit 6 by the pointer 8 shown in FIG. 2.

The mapping unit 10 can perform the transformation described above so as to fit the X-Y coordinate grid of the tablet 4 to the X-Y pixel coordinate grid of the display unit 6. In this case, the scaling factor between the X-Y coordinate grid of the tablet 4 and the X-Y pixel coordinate grid of the display unit 6 is small such that a small amount of movement on the tablet 4 results in a large amount of movement on the display unit 6. When performing this transformation, the mapping unit 10 operates in a rough positioning/movement mode with a first scaling relationship. In this mode, movement along the tablet 4 causes movement of the pointer 8 shown in FIG. 2 anywhere within the X-Y pixel coordinate grid of the display unit 6.

The mapping unit 10 is also capable of defining a smaller X-Y pixel coordinate grid by mapping the X-Y coordinate grid of the tablet 4 to a smaller region within the X-Y pixel coordinate grid of the display unit 6. In this case, the scaling factor between the X-Y coordinate grid of the tablet 4 and the X-Y pixel coordinate grid of the display unit 6 is large such that a large amount of movement on the tablet 4 results in a small amount of movement on the X-Y pixel coordinate grid of the display unit 6. When performing this transformation, the mapping unit 10 operates in a fine positioning/movement mode with a second scaling relationship. In this mode, movement along the tablet 4 causes movement anywhere within the smaller X-Y pixel coordinate grid, which defines a movement window that is smaller than the area of the display unit 6.

Figure 2:
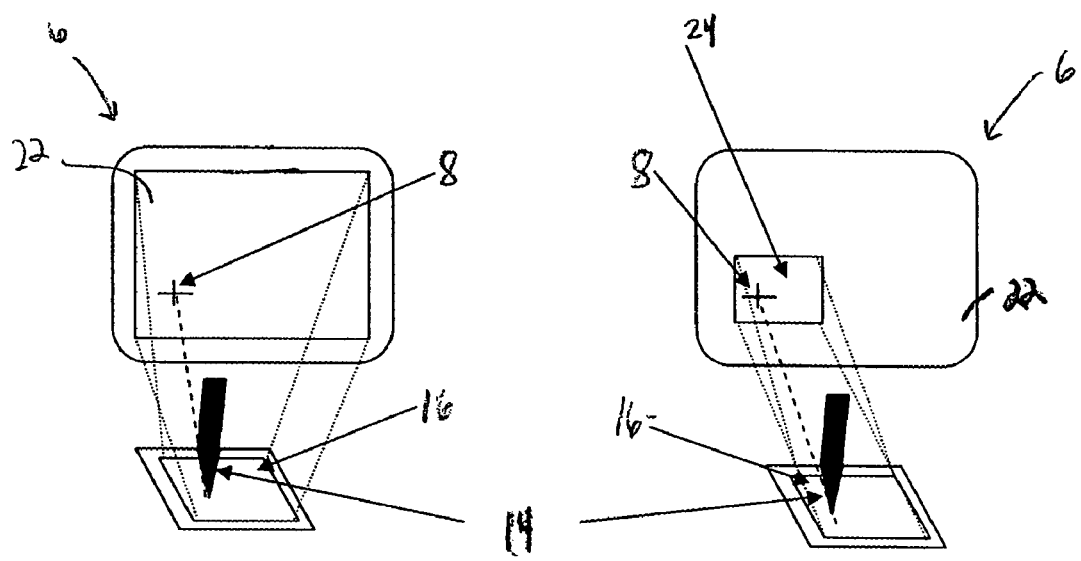
FIG. 2 illustrates a mapping operation of the mapping device of FIG. 1, according to another embodiment of the present invention.

The left side of FIG. 2 shows the display unit 6 and the tablet 4 when the mapping unit 10 operates in the rough positioning/movement mode with the first scaling relationship. The right side of FIG. 2 also shows the display unit 6 and the tablet 4 when the mapping unit 10 operates in the fine positioning/movement mode with the second scaling relationship. The display unit 6 includes a screen 22 with the pointer 8 displayed thereon. In the rough positioning/movement mode associated with the small scaling factor, the pointer 8 is freely movable around the screen 22 due to the fact that the X-Y coordinate grid of the tablet 4 is fit to the X-Y pixel coordinate grid of the entire screen 22. Thus, in this mode, small movements of the pointing device 14 along the tablet 4 cause larger movements of the pointer 8 on the screen 22.

On the other hand, in the fine positioning/movement mode associated with the large scaling factor, the pointer 8 is freely movable around a movement window 24 having a size defined by the second scaling relationship. The position of the movement window 24 within the screen 22 is defined by a current position of the pointer 8 on the screen 22 when the positioning/movement mode is switched. That is, when the input device 12 switches the operation mode of the mapping unit 10, the pointer 8 remains in the same position on the screen 22 and the mapping unit 10 defines the movement window around the current position of the pointer 8. In this manner, the pointer 8 may be moved to a rough general area on the screen 22, then finely positioned or moved to a precise location on the screen 22.

Especially when a plurality of screens are used to maximize the desktop space, small movements on the tablet 4 result in a large movement on the desktop space when the X-Y coordinate grid of the tablet 4 is fit to the X-Y pixel coordinate grid of the entire desktop space: However, the present invention allows a user to switch to a fine positioning/movement mode in which the X-Y coordinate grid of the tablet 4 is fit to a smaller display region of the X-Y pixel coordinate grid of the desktop space so that fine positioning and movement control can be achieved within the smaller display region.

Although a single screen 22 for the display unit 6 is shown as the desktop space in FIG. 2, it will be appreciated that the desktop space may include a plurality of screens 22 in a tiled arrangement in which the pointer 8 is movable. Thus, the "screen" of the display unit 6 and the "display unit 6" are used herein to refer to a desktop space of one or more screens or display monitors. The display unit 6 may include any type of display screen usable with the tablet 4. The display unit 6 may be controlled by a personal computer associated therewith, or may be controlled by the tablet 4 itself.

The scaling relationships mentioned above refer to the number of X-Y pixel coordinates on the display unit 6 per X-Y coordinate of the tablet 4. These relationships define the amount of movement on the display unit 6 caused by movement on the tablet 4. The mapping unit 10 may store a plurality of transformation functions or scaling relationships for differing degrees of positioning or movement.

The scaling factor of the fine positioning mode may be 1 or greater, or preferably 2 or greater. On the other hand, the scaling factor of the rough positioning mode may be less than 1.

For example, the mapping unit 10 may include a first scaling relationship for which a 4 inch by 5 inch X-Y coordinate grid of a tablet is fit to an 8 inch by 10 inch X-Y pixel coordinate grid of a desktop space. In this case, the scaling factor is 0.5. The mapping unit 10 in this example may also include a second scaling relationship for which the 4 inch by 5 inch X-Y coordinate grid of the tablet is fit to a smaller 3 inch by 3.75 inch region of the X-Y pixel coordinate grid of the desktop space. In this case, the scaling factor is about 1.33. The second scaling relationship may be preset and stored by a user according to their preferences for fine positioning/movement.

The mapping unit 10 may be implemented as part of the display unit 6, part of the tablet 4, or as part of a personal computer that interfaces the tablet 4 with the display unit 6. The mapping unit 10 can also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As best shown in FIGS. 1 to 3, the input device 12 controls the mapping unit 10 to switch between scaling relationships. The input device 12 may recalculate the origin and/or the scale of the screen area each time the scaling relationship is switched. When the user holds the pointing device 14 steady and the input device 12 causes the mapping unit 10 to switch modes, the pointer 8 is not moved on the screen 22. The fact that this pointer remains in the same position allows a user to seamlessly alternate between positioning/movement modes without interruptions at the same time the tablet 4 is being used in a graphics application.

The input device 12 may be a binary physical input device, for example a button 18 located on the tablet 4 shown in FIG. 3, or a button 20 located on the pointing device 14 shown in FIG. 3. Alternatively, the input device 12 may be a hotkey on a keyboard of a personal computer, a switch, a wheel, etc. By virtue of the fact that the input device 12 is positioned where it is easily accessible by a user as best shown in FIG. 3, the scaling relationship or positioning/movement mode can be switched "on the fly" during real time operation of the tablet 4 and pointing device 14. As a result, a user is not required to navigate to a control panel settings screen, menu setting screen, or dialog box and enter a plurality of selection commands in order to change scaling parameters.

According to an embodiment of the present invention, the button 18 or 20 is a toggle button that is used to change operation modes of the mapping unit 10 such that each time the button 18 or 20 is pressed, the operation mode changes.

Alternatively, the button 18 or 20 may be maintained or held in a pressed state to operate in the fine positioning/movement mode, and released to restore the rough positioning/movement mode. In this case, a user is continuously aware of the current positioning/movement mode of the mapping unit 10.

The ease with which the positioning/movement modes are switched by a user is particularly useful in drawing or graphic design applications where a large desktop space is used. In this case, a user can quickly and easily change between positioning/movement modes to draw or move the pointer 8 shown in FIG. 2 with different degrees of detail.

Figure 4:
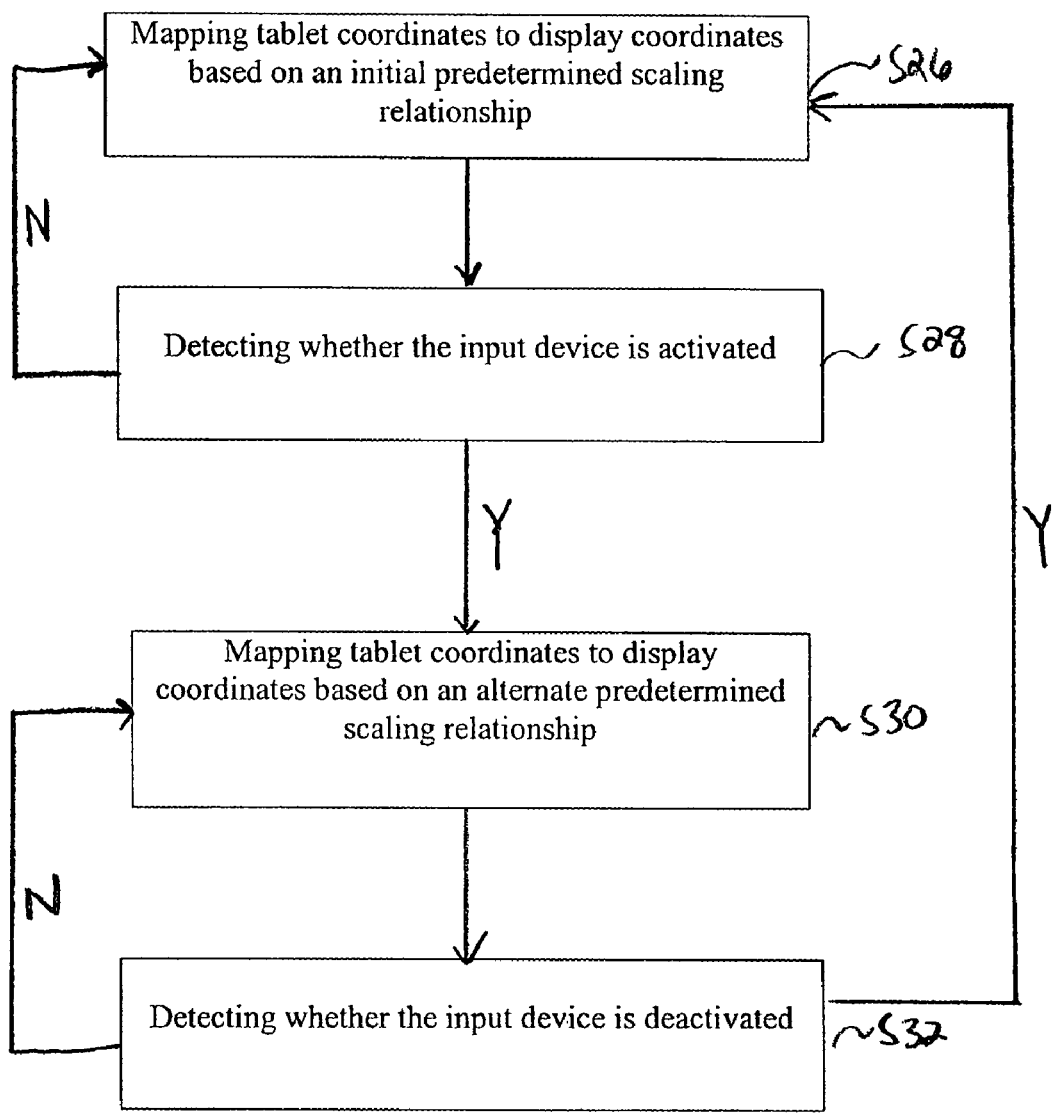
FIG. 4 is a flowchart illustrating a method of mapping positional data of a digitizer tablet to positional data of a display screen according to another embodiment of the present invention.

As best shown in FIG. 4, a method of mapping positional data from the tablet 4 to positional data of the display unit 6 begins with step S26. In step S26, tablet coordinates are mapped to display coordinates by the mapping unit 10 based on an initial predetermined scaling relationship. In step S28, it is determined whether the input device 12 is activated for switching the operation of the mapping unit 10. If the input device 12 is determined to be activated in step S28, the tablet coordinates are mapped to display coordinates by the mapping unit 10 based on an alternate predetermined scaling relationship in step S30. In this step, the mapping unit 10 creates a movement window around the current position of the pointer 8 shown in FIG. 2. If the input device 12 is determined not be activated in step S28, the mapping unit 10 continues to map the tablet coordinates to the display coordinates based on the initial relationship.

In step S32 it is determined whether the input device is deactivated. If the input device is determined to be deactivated in step S32, the initial predetermined scaling relationship is restored in step S26. Otherwise, operation is continued using the alternate scaling relationship in step S30.

Although the description herein describes first and second scaling relationships and rough and fine positioning/movement modes, it should be understood that more than two scaling relationships or positioning/movement modes may be used with the present invention.

Additionally, although the embodiments of the present invention are described with reference to the tablet 2 of the digitizer system 2, it should be understood that the present invention may alternatively be used with other movement input devices used to move a cursor or pointer on a desktop or screen. Some other exemplary movement input devices include, but are not limited to, a mouse, a joystick, a trackball, etc.

Although a few embodiments of the present invention have been shown and described, it will be appreciated by those skilled in the art that changes may be made in these embodiments without departing from the principles and spirit of the invention, the scope of which is defined in the appended claims and their equivalents.

I claim:

1. A mapping device suitable for use in combination with a pointing device, a display unit having a display screen, and a digitizer tablet including sensing elements arranged below a detection surface and being operatively associated with the pointing device for generating tablet positional data representing tablet input coordinates of the pointing device relative to the sensing elements as the pointing device is moved on or near the detection surface, the mapping device comprising:

a unit operable in first and second modes for respectively applying first and second scaling relationships to the tablet positional data to generate display positional data for the display screen of the display unit, the display positional data representing screen coordinates corresponding to the tablet input coordinates of the pointing device on or near the detection surface, the first and second scaling relationships being different from one another such that for a given amount of movement by the pointing device on or near the detection surface, the screen coordinates generated by the first scaling relationship of the first mode represent a different distance on the display screen than the screen coordinates generated by the second scaling relationship of the second mode; and a user-activated mode switching device for permitting the user to selectively switch the unit between the first and second modes without changing the screen coordinates so that upon switching between modes the screen coordinates remain unchanged and continue to correspond to the tablet input coordinates of the pointing device on or near the detection surface, the user-activated mode switching device permitting switching between the first and second modes irrespective of the location of the screen coordinates relative to the display screen.

2. The mapping device of claim 1, wherein in the first mode the tablet input coordinates are mapped to screen coordinates lying in a first region of a first size, wherein in the second mode the tablet input coordinates are mapped to screen coordinates lying in a second region of a second size, and wherein the first size is different than the second size.

3. The mapping device of claim 1, wherein the first scaling relationship is configured such that the detection surface of the digitizer tablet maps to an entire surface of the display screen, and wherein the second scaling relationship is configured such that the detection surface of the digitizer tablet maps to less or more than the entire surface of the display screen.

4. The mapping device of claim 1, wherein the user-activated mode switching device is located on or constitutes part of the pointing device, the digitizer tablet, or a personal computer.

5. The mapping device of claim 1, wherein at least one of the scaling relationships is preset by the user.

6. The mapping device of claim 1, wherein the unit constitutes part of the digitizer tablet, part of the display unit, or part of a personal computer that interfaces the digitizer tablet with the display unit.

7. A system comprising:
a pointing device;
a digitizer tablet comprising sensing elements arranged below a detection surface, the digitizer tablet being operatively associated with the pointing device for generating tablet positional data representing tablet input coordinates of the pointing device relative to the sensing elements as the pointing device is moved on or near the detection surface;
a mapping unit operable in first and second modes for respectively applying first and second scaling relationships to the tablet positional data to generate display positional data for a display screen of a display unit, the display positional data representing screen coordinates corresponding to the tablet input coordinates of the pointing device on or near the detection surface, the first and second scaling relationships being different from one another such that for a given amount of movement by the pointing device on or near the detection surface, the screen coordinates generated by the first scaling relationship of the first mode represent a different distance on the display screen than the screen coordinates generated by the second scaling relationship of the second mode;

a user-activated mode switching device for permitting the user to selectively switch the mapping unit between the first and second modes without changing the screen coordinates so that upon switching between modes the screen coordinates remain unchanged and continue to correspond to the tablet input coordinates of the pointing device on or near the detection surface, the user-activated mode switching device permitting switching between the first and second modes irrespective of the location of the screen coordinates relative to the display screen.

8. The system of claim 7, wherein the pointing device is pen shaped.

9. The system of claim 7, wherein in the first mode the tablet input coordinates are mapped to screen coordinates lying in a first region of a first size, wherein in the second mode the tablet input coordinates are mapped to screen coordinates lying in a second region of a second size, and wherein the first size is different than the second size.

10. The system of claim 7, wherein the sensing elements are arranged in an X-Y coordinate grid.

11. The system of claim 7, wherein the user-activated mode switching device comprises a button, a key, a wheel, or a switch associated with the digitizer tablet.

12. The system of claim 7, wherein the first scaling relationship is configured such that the detection surface of the digitizer tablet maps to an entire surface of the display screen, and wherein the second scaling relationship is configured such that the detection surface of the digitizer tablet maps to less or more than the entire surface of the display screen.

13. The system of claim 7, wherein the user-activated mode switching device is located on or constitutes part of the pointing device, the digitizer tablet, or a personal computer.

14. The system of claim 7, wherein at least one of the scaling relationships is preset by the user.

15. The system of claim 7, wherein the mapping unit constitutes part of the digitizer tablet, part of the display unit, or part of a personal computer that interfaces the digitizer tablet with the display unit.

16. The system of claim 7, wherein the system comprises the display unit.

17. A method of mapping positional data from a digitizer tablet to a display screen, comprising:
generating tablet positional data representing tablet input coordinates of a pointing device relative to sensing elements of a digitizer tablet as the pointing device is moved on or near a detection surface of the digitizer table, the sensing elements being arranged below the detection surface;
operating a mapping unit in a first mode to apply a first scaling relationship to the tablet positional data to generate display positional data for a display screen of a display unit, the display positional data representing screen coordinates corresponding to the tablet input coordinates of the pointing device on or near the detection surface;
activating a mode switching device to selectively switch between the first mode and a second mode to apply a second scaling relationship without changing the screen coordinates so that upon switching between the first and second modes the screen coordinates remain unchanged and continue to correspond to the tablet input coordinates of the pointing device on or near the detection surface, the mode switching device permitting switching between the first and second scaling relationships irrespective of the location of the screen coordinates relative to the display screen; and operating the mapping unit in the second mode to apply the second scaling relationship to the tablet positional data, wherein the first and second scaling relationships are different from one another such that for a given amount of movement by the pointing device on or near the detection surface, the screen coordinates generated by the first scaling relationship of the first mode represent a different distance on the display screen than the screen coordinates generated by the second scaling relationship of the second mode.

18. The method of claim 17, wherein in the first mode the tablet input coordinates are mapped to screen coordinates lying in a first region of a first size, wherein in the second mode the tablet input coordinates are mapped to screen coordinates lying in a second region of a second size, and wherein the first size is different than the second size.

19. The method of claim 17, wherein the mode switching device is located on or constitutes part of the pointing device, the digitizer tablet, or a personal computer.

* * * * *